April 27, 1965 HIROSHI AMEMIYA 3,181,132
MEMORY
Filed June 29, 1962
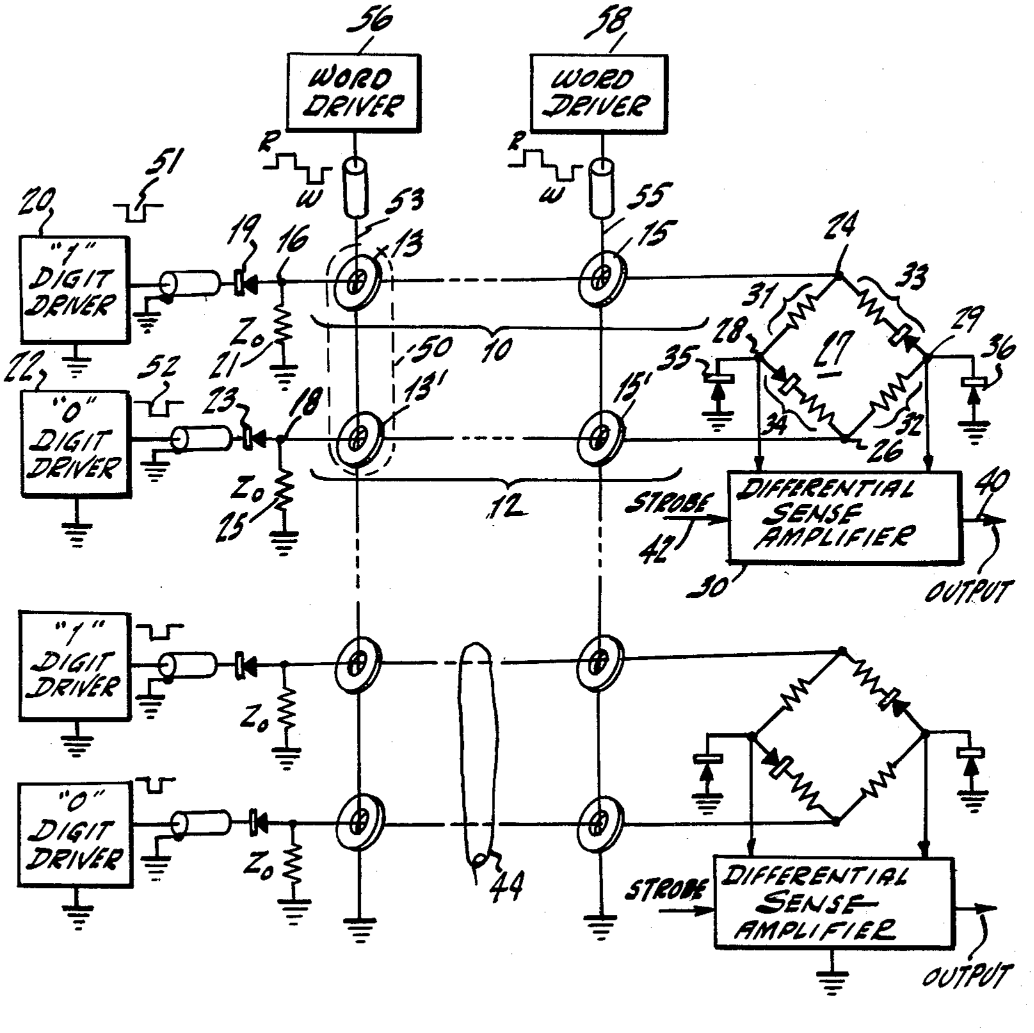
INVENTOR.
HIROSHI AMEMIYA
BY Carl V. Olson
Attorney

United States Patent Office 3,181,132
Patented Apr. 27, 1965

3,181,132
MEMORY

Hiroshi Amemiya, Levittown, N.J., assignor to Radio Corporation of America, a corporation of Delaware Filed June 29, 1962, Ser. No. 206,302
9 Claims. (Cl. 340—174)

This invention relates to information storage systems, and particularly to random access memories.

Random access memories are commonly constructed in the form of rows and columns of ferrite magnetic core memory elements threaded by row and column conductors. There is a demand for memories capable of faster operation, and there is also a demand for memories of ever increasing information storage capacity. One way of increasing the speed of operation of a memory is to employ two memory elements for each bit of information in such a way as to cancel disturbances which otherwise limit the speed of operation.

When attempts are made to increase the speed of operation of a memory, and when attempts are made to increase the information storage capacity, the time required for an electrical pulse to travel along a conductor in the memory becomes significant in relation to the width of the pulse and in relation to the time of occurrence of cooperating pulses in the system. The conductors threaded in the memory elements can no longer be considered as merely wires, but must be analyzed and designed in terms of propagation delays and impedance terminations that prevent reflections.

It is an object of this invention to provide an improved memory array configuration providing high speed operation and minimizing the undesired consequences of propagation delays in conductors threaded through the array.

It is another object to provide an improved memory including a digit-sense conductor having a digit driver at one end, a sense amplifier at the opposite end and means to accommodate both digit and sense signals on the conductor.

It is a further object to provide an improved memory including a common digit-sense conductor having means to prevent disturbing reflections from the ends of the conductors.

It is a still further object to provide an improved word-organized memory including digit-sense conductors terminated at both ends in such a way as to optimize the coupling of digit pulses to the line and to optimize the coupling of sense signals from the line to the sense amplifier.

According to an example of the invention, a memory array is constructed having a plurality of word conductors and a plurality of pairs of orthogonally related digit-sense conductors. Memory elements such as ferrite magnetic cores are provided at all crossovers of the conductors. At one end of each pair of digit-sense conductors, a "1" digit driver is coupled through a series diode and a shunt terminating impedance to one conductor of the pair, and a "0" digit driver is coupled through another series diode and shunt terminating resistor to the other conductor of the pair. A differential sense amplifier is coupled to the opposite end of each digit-sense conductor pair by means of a bridge circuit. Each two memory elements linked by a word conductor and the two conductors of a sense conductor pair are used for the storage of one bit of information. Each digit-sense conductor has a length in relation to the speed of operation of the system so that its distributed reactances make the conductor a transmission line having a characteristic impedance.

The bridge circuit is constructed and arranged to present a terminating impedance characteristic to digit pulses arriving at the sense amplifier end of the digit-sense line, and to present small equal digit voltages to the two inputs of the differential sense amplifier where they cancel each other. The bridge circuit is also constructed and arranged so that sense signals arriving from the two digit-sense conductors of a pair are applied without terminating attenuation to the respective inputs of the differential sense amplifier. At the digit driver end of each digit-sense conductor, the series diode and shunt terminating impedance permit the coupling of digit pulse to the digit-sense line while providing a reflection-preventing termination for sense signals and reflected small-amplitude digit pulses arriving at the digit driver end of the digit-sense conductor.

These and other objects and aspects of the invention will be more apparent to those skilled in the art from the following more detailed description taken in conjunction with the appended drawing, wherein:

The sole figure of the drawing illustrates a memory matrix employing two memory elements or cores for the storage of each information bit. A pair of digit sense conductors 10 and 12 each thread or link a plurality of memory elements or cores 13, 15, and 13', 15', respectively, equal in number to the number of words in the memory. While the digit-sense conductors 10, 12 are shown as each linking only two cores, it will be understood that the conductors will normally link a large number of cores and will have a length and distributed reactance in relation to the width and repetition rate of pulses thereon so that the conductors must be considered to be transmission lines having a characteristic impedance $Z_0$. The distributed impedance is made up of uniformly distributed resistance, uniformly distributed capacitive reactance and inductive reactance which, although lumped at the cores, may be considered to be uniformly distributed along the line.

The digit-sense conductors 10, 12 are coupled at their left-hand ends 16 and 18 through respective series diodes 19 and 23 to a "1" digit driver 20 and a "0" digit driver 22. The diodes 19 and 23 are poled to readily pass pulses from the drivers to the conductors. The digit pulses may, for example, have a current of about 80 milliamperes and a voltage of about 15 volts. The diodes 19 and 23, and the other diodes to be described, are conductive only in the forward direction and only when the forward voltage exceeds about 0.2 or 0.3 volt. The ends 16 and 18 of the digit-sense conductors 10 and 12 are connected through respective terminating resistors 21 and 25, each having the impedance $Z_0$, to a return path such as ground.

The opposite right-hand ends 24, 26 of the digit-sense conductors 10, 12 are connected to two diagonal terminals of a bridge circuit 27. The bridge circuit has another pair of diagonal terminals 28 and 29 which are connected to the two respective inputs of a differential sense amplifier 30. The bridge circuit has two opposite similar legs 31 and 32 each including a resistor, and has another two opposite legs 33 and 34 each including a resistor and a diode connected in series. The anodes of the diodes in the legs 34 and 33 are connected to the bridge terminals 28 and 29, respectively. The diagonal terminals 28 and 29 are connected through respective diodes 35 and 36 to a return path such as ground. The cathodes of the diodes 35 and 36 are connected to the bridge terminals 28 and 29, respectively. The resistance of each of the legs 31, 32, 33, 34 is selected to equal two times the characteristic impedance $Z_0$ of each of digit-sense conductors 10, 12. The input impedance of the differential sense amplifier 30 between each of its input terminals and ground is designed to be very high compared with the characteristic impedance $Z_0$ of each digit-sense conductor. The input impedance may be ten or more times the impedance $Z_0$.

The differential sense amplifier 30 is biased to be normally inoperative to provide an output at output lead 40. The amplifier can provide an output only at a desired short time as determined by the application thereto of a strobe pulse on strobe input lead 42.

A second similar pair of digit-sense conductors 44 and associated elements are shown to illustrate that an actual memory matrix will contain a plurality of digit-sense conductor pairs equal to the number of information bits in each word location in the memory.

An orthogonally related word conductor 53 links all the memory elements 13, 13′, etc., at the digit driver ends of the digit-sense conductors, and a word conductor 55 links all the memory elements 15, 15′ at the sense amplifier ends of all the digit-sense conductors. The word conductors 53 and 55 are supplied with read pulses R and write pulses W from respective word drivers 56 and 58. The word conductors 53 and 55 are short compared with the digit-sense conductors so that there is no significant delay in the propagation of read-write pulses down the word lines.

The two cores encircled at 50 are two cores for the storage of one bit of information of the word along the word conductor 53. To generalize, a bit of information is stored in the two cores or memory elements which are linked by a word conductor and the two conductors of a digit-sense conductor pair.

The operation of the invention will now be explained by describing the writing of a bit of information into the information bit location 50, and reading the stored information therefrom. Both cores are assumed to be in an initial state. If it is desired to write a "1" into the location 50, a "1" digit pulse 51 from driver 20 is applied to the end 16 of the digit-sense conductor 10 at a time such that it will arrive at the magnetic core 13 coincidentally with a write pulse W supplied to the word conductor 53 from the word driver 56. The digit pulse 51 and the write pulse W cause the core 13 to switch. The core 13′ receives only the write pulse W which is of insufficient amplitude to cause the core 13′ to switch. The cores 13 and 13′ of the information bit location 50 then have magnetic states representing the storage of a "1" bit of information.

The "1" digit pulse 51 from the driver 20 has an amplitude and polarity to readily pass through the series diode 19. The energy of the digit pulse then divides equally in the terminating resistor 21 having the impedance $Z_0$ and the digit-sense conductor 10 having the characteristic impedance $Z_0$.

The digit pulse travels down the digit-sense line 10 to remote end 24 where it divides into one path including bridge leg 31 and diode 35 and another path including bridge leg 33 and diode 36. The two paths in parallel present the characteristic impedance $Z_0$ at the terminal 24 with the result that the digit pulse is terminated or dissipated. There is a small amplitude reflection which travels back down the digit-sense line to the other end 16 where it is unable (regardless of its polarity) to render diode 19 conductive and it is dissipated in the terminating resistor 21. The reflection of the digit pulse from the bridge circuit 27 has a small amplitude comparable with the amplitude of the sense signal. The reflection is due primarily to the conduction voltage threshold, which may be 0.2 or 0.3 volt, or the diodes in the bridge circuit.

The division of digit current in the parallel legs 31 and 33 results in small, substantially equal digit pulse voltages at the diagonal terminals 28 and 29 at the input of the differential sense amplifier 30. The equal digit voltages applied to the two input terminals of the differential sense amplifier are due to the drops across diodes 35 and 36 and are cancelled in the sense amplifier. Therefore, the amplifier does not have to recover from a large unbalanced input before it can properly respond to a succeeding sense signal. The balancing action of the bridge circuit permits a higher speed of operation of the memory system.

When it is desired to read the information stored in the bit location 50, a positive read pulse R is applied to the word line 53 by the word driver 56. The read pulse R causes the magnetic core 13 to switch back to its initial direction of magnetization, but does not cause a net change in the magnetic core 13′ which is already magnetized in the initial direction. Therefore, a desired sense signal is induced on the digit-sense line 10, but not on the digit-sense line 12.

The sense signal induced in the digit-sense line 10 at the magnetic core 13, results in a positive pulse traveling to the left until it reaches and is dissipated without reflection in the terminating impedance 21. The positive sense pulse is of insufficient amplitude (such as 40 millivolts) to make diode 19 conductive. (As will be described later, there is a disturbing pulse which reaches the diode 19 at the same time as the sense pulse. The combined amplitude, which may be about 190 millivolts, of the sense pulse and the disturbing pulse is insufficient to make the diode 19 conductive.) The sense signal induced in the magnetic core 13 also results in a negative pulse traveling to the right until it reaches the end 24 of the line 10. The negative sense signal pulse, being of small amplitude is unable to render the diode in leg 33 conductive. Therefore, the entire sense signal pulse flows from terminal 24 through leg 31 to the corresponding input of differential sense amplifier 30. The input impedance from each input terminal to ground of the differential sense amplifier 30 is made very much greater than the characteristic impedance $Z_0$, so that the sense signal sees what is nearly an open circuit. An open circuited end of a transmission line causes a doubling of the voltage of a signal arriving at the open circuited end, and a reflection of the signal back along the line. The doubling of the sense signal voltage at the input of the sense amplifier 30 reduces the sensitivity requirements of the sense amplifier. The reflected portion of the sense signal returns back along the digit-sense line 10 until it reaches the characteristic impedance $Z_0$ of the terminating resistor 21, and is harmlessly dissipated.

The foregoing has described how the application of a read pulse R to the word line 53 causes a sense signal to be induced in the line 10 due to switching of the flux in core 13, and how the sense signal is applied to the differential sense amplifier 30. The read pulse R on word line 53 also causes equal disturbing pulses to be induced on both digit-sense lines 10 and 12, due to reversible switching of flux in the respective cores 13 and 13′. These equal disturbing pulses may have an amplitude greater than the sense signal pulse on line 10, the sense signal being due to irreversible switching of the flux in core 13. The disturbing pulse on line 10 is applied through leg 31 of bridge 27 to one input 28 of the differential sense amplifier 30, and the disturbing pulse on line 12 is applied through leg 32 of the bridge to the other input 29 of the differential sense amplifier. The equal disturbing pulses are cancelled in the sense amplifier, and the sense amplifier responds solely to the sense signal, which represents the difference between the voltages applied to the two inputs of the amplifier.

The storage and reading of a "1" bit in the bit location 50 has been described. If it is desired to store a "0" in this location, the "0" digit driver 22 is energized at a time such that a negative digit pulse 52 reaches the magnetic core 13′ coincident with the arrival there of the write pulse W from the word driver 56. In this case, the core 13′ switches, and the core 13 remains in its initial normal state of magnetization. A read pulse R then induces a sense signal in the digit-sense line 12 which is directed to the other input of the differential sense amplifier 30 to result in a "0" output on the output lead 40 of the differential sense amplifier. Irreversible or net flux change in a core on the digit-sense conductor 10 is used in the storage and reading of a "1" bit, and irreversible or net flux change in a core on the digit-sense conductor 12 is used in the storage and reading of a "0" information bit. Two cores are employed for each bit for the purpose, as is well known, of cancelling noise or disturbance signals that might otherwise impair the reliability of response of the sense amplifier. The mode of operation described with reference to the information bit location 50 applies likewise to the many other bit locations in the memory matrix illustrated in simplified form in the drawing.

It is thus seen that, according to the invention, the digit driver end 16 of the digit-sense line 10 is terminated in such a way that there is efficient coupling of the digit pulses to the line 10, and so that reflections and sense signals arriving at the ends 16, being of small amplitude, are terminated without reflection in the terminating resistor 21. The arrangement is one wherein a sense signal or a reflection, being of small amplitude, always sees the characteristic impedance $Z_0$ at the end 16 of the line. The digit driver always sees the impedance one-half $Z_0$ at the end 16 of the line. Therefore, the output impedance of the digit driver and the impedance of the connecting cable can be selected for optimum energy transfer without any inconsistent limitation as would otherwise be imposed (in the absence of diodes 19 and 23) by the need to also terminate the line for sense signals and reflections.

It is also seen that the bridge circuit at the sense amplifer end of the digit-sense line 10 provides a characteristic impedance termination for absorbing the digit pulse arriving at terminal 24. The bridge circuit 27 also provides two parallel paths to ground for the digit pulse so that only small equal digit voltages (appearing across conducting diodes 35, 36) are applied to the two inputs of the differential sense amplifier where they cancel without blocking the amplifier. Furthermore, it is seen that the bridge circuit provides an open circuit termination for line 10 so that the sense signal voltage are effectively doubled at the input of the sense amplifier. What has been said about signals on digit-sense line 10 applies also, of course, to all other digit-sense lines. Finally, it is seen that, during reading, the bridge circuit provides two equal-impedance paths for disturbing signals on lines 10 and 12 to the two respective inputs of the differential amplifier, where the disturbing signals are cancelled.

What is claimed is:

1. In a memory system, the combination of
a pair of digit-sense conductors each of which links an equal plurality of memory elements and has a characteristic impedance,
digit drivers coupled to one end of the digit-sense conductor pair,
a differential sense amplifier having two inputs,
and a bridge circuit having two diagonal terminals connected respectively to the two conductors at the other end of the digit-sense conductor pair and having two other diagonal terminals connected respectively to the two inputs of the differential sense amplifier.

2. In a memory system, the combination of
a pair of digit-sense conductors each of which links an equal plurality of memory elements and has a characteristic impedance,
digit drivers coupled to one end of the digit-sense conductor pair,
a differential sense amplifier having two inputs,
two diodes,
and a bridge circuit having two diagonal terminals connected respectively to the two conductors at the other end of the digit-sense conductor pair and having two other diagonal terminals connected respectively through said diodes to a return path such as ground and to the two inputs of the differential sense amplifier.

3. In a two-element-per-bit memory system, the combination of a pair of digit-sense conductors each of which links an equal plurality of memory elements and has distributed reactances so that it constitutes a transmission line having a characteristic impedance,
a pair of digit drivers each coupled to one end of respective conductors of the digit-sense conductor pair,
a differential sense amplifier having two inputs,
two diodes,
and a bridge circuit having two diagonal terminals connected respectively to the two conductors at the other end of the digit-sense conductor pair and having two other diagonal terminals connected respectively through said diodes to a return path such as ground and to the two inputs of the differential sense amplifier, said bridge circuit and said diodes providing two parallel paths each having twice said characteristic impedance for digit pulses from each digit-sense conductor to the return path, whereby digit pulses are substantially dissipated in the bridge circuit and equal voltages developed across said diodes are substantially cancelled in the differential sense amplifier, said bridge circuit also providing one conductive path for sense signals from each digit-sense conductor to a respective one of the inputs of the differential amplifier.

4. In a memory system, the combination of
a pair of digit-sense conductors each of which links an equal plurality of memory elements and has a characteristic impedance,
digit drivers coupled to one end of the digit-sense conductor pair,
a differential sense amplifier having two inputs,
two diodes,
and a bridge circuit having two diagonal terminals connected respectively to the two conductors of the digit-sense conductor pair at the other end thereof and having two other diagonal terminals connected through respective ones of said diodes to a return path such as ground and to the two respective inputs of the differential sense amplifier, said bridge circuit having four legs each including a resistance substantially equal to twice the characteristic impedance of said digit-sense conductors, two opposite ones of said legs each also including a diode.

5. In a two-element-per-bit memory system, the combination of
a pair of digit-sense conductors each of which links an equal plurality of memory elements and has distributed reactances so that it constitutes a transmission line having a characteristic impedance,
a pair of digit drivers each coupled to one end of respective conductors of the digit-sense conductor pair,
a differential sense amplifier having two inputs.
two diodes,
and a bridge circuit having two diagonal terminals connected respectively to the two conductors of the digit-sense conductor pair at the other end thereof and having two other diagonal terminals connected through respective ones of said diodes to a return path such as ground and to the two respective inputs of the differential sense amplifier, said bridge circuit having four legs each including a resistance substantially equal to twice the characteristic impedance of said digit-sense conductors, two opposite ones of said legs each also including a diode.

6. In a memory system, the combination of
a pair of digit-sense conductors each of which links an equal plurality of memory elements and has a characteristic impedance,
a digit driver coupled through a first diode to one end of one conductor of the digit-sense conductor pair,
a shunt resistor having said characteristic impedance connected from the conductor side of said diode to a return path such as ground, a differential sense amplifier having two inputs,
second and third diodes,
and a bridge circuit having two diagonal terminals connected respectively to the two conductors of the digit-sense conductor pair and having two other diagonal terminals connected through respective ones of said second and third diodes to a return path such as ground and to the two inputs of the differential sense amplifier.

7. In a memory system, the combination comprising
a pair of digit-sense conductors each of which links an equal plurality of memory elements and has distributed reactances so that it constitutes a transmission line having a characteristic impedance,
first and second diodes,
a pair of digit drivers each coupled through one of said first and second diodes to one end of respective conductors of the digit-sense conductor pair,
a shunt resistor having said characteristic impedance connected from the conductor side of each of said first and second diodes to a return path such as ground,
a differential sense amplifier having two inputs, third and fourth diodes,
and a bridge circuit having two diagonal terminals connected to the two conductors of the digit-sense conductor pair at the other end thereof and having two other diagonal terminals connected through respective ones of said third and fourth diodes to a return path such as ground and to the two inputs of the differential sense amplifier, said bridge circuit having four legs each including a resistance equal to twice the characteristic impedance of said digit-sense conductors, two opposite ones of said legs each also including a diode.

8. In a two-element-per-bit memory system, the combination of
a pair of digit-sense conductors each of which links an equal plurality of memory elements and has distributed reactances so that it constitutes a transmission line having a characteristic impedance,
first and second diodes,
a pair of digit drivers each coupled through one of said first and second diodes to one end of respective conductors of the digit-sense conductor pair,
a shunt resistor having said characteristic impedance connected from the conductor side of each of said first and second diodes to a return path such as ground,
a differential sense amplifier having two inputs,
third and fourth diodes,
and a bridge circuit having two diagonal terminals connected to the two conductors of the digit-sense conductor pair at the other end thereof and having two other diagonal terminals connected through respective ones of said third and fourth diodes to a return path such as ground and to the two inputs of the differential sense amplifier, said bridge circuit and said third and fourth diodes providing two parallel paths each having twice said characteristic impedance for digit pulses from each digit-sense conductor to the return path, said bridge circuit also providing one conductive path for sense signals from each digit-sense conductor to a respective one of the inputs of the differential amplifier.

9. In a two-element-per-bit memory system, the combination of
a pair of digit-sense conductors each of which links are equal plurality of memory elements and has distributed reactances so that it constitutes a transmission line having a characteristic impedance,
first and second diodes,
a pair of digit drivers each coupled through one of said first and second diodes to one end of respective conductors of the digit-sense conductor pair,
a shunt resistor having said characteristic impedance connected from the conductor side of each of said first and second diodes to a return path such as ground, each of said diodes being poled to conduct when a digit pulse is applied therethrough to the digit-sense line, a sense signal arriving at said diode being of insufficient amplitude to render the diode conductive and thus being dissipated in the shunt resistor,
a differential sense amplifier having two inputs,
third and fourth diodes,
and a bridge circuit having two diagonal terminals connected to the two conductors of the digit-sense conductor pair at the other end thereof and having two other diagonal terminals connected through respective ones of said third and fourth diodes to a return path such as ground and to the two inputs of the differential sense amplifier, said bridge circuit and said third and fourth diodes providing two parallel paths each having twice said characteristic impedance for digit pulses from each digit-sense conductor to the return path, whereby digit pulses are substantially dissipated in the bridge circuit and the equal voltages developed across said third and fourth diodes are substantially cancelled in the sense amplifier, said bridge circuit also providing one conductive path for sense signals from each digit-sense conductor to a respective one of the inputs of the differential amplifier.

References Cited by the Examiner

UNITED STATES PATENTS

| | | | |
|---|---|---|---|
| 2,900,624 | 8/59 | Stuart-Williams et al. | 340—174 |
| 3,003,139 | 10/61 | Perkins | 340—174 |
| 3,112,470 | 11/63 | Barrett et al. | 340—174 |

OTHER REFERENCES

Bruce, G. T., Siegle, W. T.: IBM Technical Disclosure Bulletin, vol. 3, No. 10, March 1961, p. 109, TK7800.113.

Thome, R. E.: IBM Technical Disclosure Bulletin, vol. 3, No. 10, March 10, 1961, p. 63, TK 7800.113.

IRVING L. SRAGOW, *Primary Examiner.*